(12) United States Patent
Robinson et al.

(10) Patent No.: US 8,877,018 B2
(45) Date of Patent: *Nov. 4, 2014

(54) PROCESS FOR THE PREPARATION OF HYDROXY GALLIUM PHTHALOCYANINE

(75) Inventors: Sarah J. Robinson, Mississauga (CA); Marko Saban, Toronto (CA); Yulin Wang, Oakville (CA); Sandra J. Gardner, Oakville (CA); Cuong Vong, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/439,282

(22) Filed: Apr. 4, 2012

(65) Prior Publication Data

US 2013/0264188 A1 Oct. 10, 2013

(51) Int. Cl.
*B01J 19/10* (2006.01)
*B01J 37/34* (2006.01)

(52) U.S. Cl.
USPC ............. 204/157.72; 204/157.42; 204/157.62

(58) Field of Classification Search
USPC .............. 204/157.62, 157.72, 157.71, 157.69
See application file for complete search history.

(56) References Cited

U.S. PATENT DOCUMENTS

| | | | |
|---|---|---|---|
| 3,121,006 A | 2/1964 | Middleton et al. | |
| 3,948,489 A * | 4/1976 | Sawyer | 366/337 |
| 4,464,450 A | 8/1984 | Teuscher | |
| 4,587,189 A | 5/1986 | Hor et al. | |
| 4,921,773 A | 5/1990 | Melnyk et al. | |
| 5,002,847 A * | 3/1991 | Utsumi et al. | 204/157.42 |
| 5,069,993 A | 12/1991 | Robinette et al. | |
| 5,563,261 A * | 10/1996 | Keoshkerian et al. | 540/141 |
| 7,188,993 B1 | 3/2007 | Howe et al. | |
| 7,695,817 B2 | 4/2010 | Lin et al. | |
| 7,816,415 B2 | 10/2010 | Quapp et al. | |
| 7,866,878 B2 | 1/2011 | Howe et al. | |
| 8,124,309 B2 * | 2/2012 | Lai et al. | 430/137.18 |
| 8,568,952 B2 * | 10/2013 | Vong et al. | 430/135 |
| 8,642,241 B2 * | 2/2014 | Kamel et al. | 430/137.1 |
| 8,657,894 B2 * | 2/2014 | Pearce et al. | 366/108 |
| 2006/0105263 A1 * | 5/2006 | Moffat et al. | 430/110.2 |
| 2006/0152998 A1 * | 7/2006 | Burr et al. | 366/116 |
| 2006/0286468 A1 * | 12/2006 | Chambers et al. | 540/141 |
| 2007/0181416 A1 * | 8/2007 | Jung et al. | 204/157.72 |
| 2007/0259281 A1 * | 11/2007 | Lin et al. | 540/140 |
| 2009/0004584 A1 * | 1/2009 | Wu | 540/142 |
| 2009/0297972 A1 | 12/2009 | Sakimura et al. | |
| 2010/0104964 A1 | 4/2010 | Koike et al. | |
| 2010/0266948 A1 | 10/2010 | Lai et al. | |
| 2010/0266949 A1 | 10/2010 | Lai et al. | |
| 2013/0189616 A1 * | 7/2013 | Vong et al. | 430/135 |

OTHER PUBLICATIONS

Le, U.S. Appl. No. 13/358,157, Notice of Allowance & Fees Due, 20110583-US-NP, Jul. 26, 2013, 12 pages.

* cited by examiner

*Primary Examiner* — Keith Hendricks
*Assistant Examiner* — Colleen M Raphael
(74) *Attorney, Agent, or Firm* — Hoffman Warnick LLC

(57) ABSTRACT

The present teachings describe a process for converting a HOGaPc Type I polymorph to the HOGaPc Type V polymorph. The process includes obtaining a slurry comprising hydroxy gallium phthalocyanine (HOGaPc) Type I polymorph. The slurry is mixed at a resonant frequency of the slurry by applying a low frequency acoustic field for a time sufficient to convert the HOGaPc Type I polymorph to the HOGaPc Type V polymorph.

18 Claims, 4 Drawing Sheets

PROCESS FOR THE PREPARATION OF HYDROXY GALLIUM PHTHALOCYANINE

BACKGROUND

1. Field of Use

The present disclosure relates to processes for producing hydroxy gallium phthalocyanine (HOGaPc) compounds for use in imaging.

2. Background

Problems associated with prior art polymorph interconversions of hydroxy gallium phthalocinane include scalability limitations of roll-milling processes. The problems are manifested in the inability to manufacture and handle suitable milling vessels at various sizes. Further the production of Type V hydroxy gallium phthalocyanine provided by a roll mill process can possess inferior photosensitivity properties. Other operational and logistical problems include long milling times (typically 1 to 10 days), followed by work-up, which limits a plant capacity.

A more reliable and efficient process for producing Type V HOGaPc is desired.

SUMMARY

According to an embodiment, there is provided a process that includes obtaining a slurry comprising hydroxy gallium phthalocyanine (HOGaPc) Type I polymorph, milling media and a solvent. The slurry is mixed at a resonant frequency of the slurry by applying a low frequency acoustic field for a time sufficient to convert the HOGaPc Type I polymorph to the HOGaPc Type V polymorph.

According to another embodiment, there is provided a process comprising mixing a slurry comprising hydroxy gallium phthalocyanine (HOGaPc) Type I polymorph in an organic solvent with glass beads having a resonant frequency for a time sufficient to convert the HOGaPc Type I polymorph to the HOGaPc Type V polymorph. The HOGaPC Type V polymorph has major peaks at 7.4, 9.8, 12.4, 16.2, 17.6, 18.4, 21.9, 23.9, 25.0 and 28.1 and with the highest peaks at 7.4 and 28.1 degrees 2 Theta.

According to another embodiment, there is disclosed a process comprising mixing a slurry comprising from about 2 weight percent to about 10 weight percent hydroxy gallium phthalocyanine (HOGaPc) Type I polymorph in N,N-dimethylformamide with glass beads having a size of from about 0.5 mm to about 10 mm at a resonant frequency for about 10 minutes to about 20 minutes to convert the HOGaPc Type I polymorph to the HOGaPc Type V polymorph.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

In the following description, reference is made to the chemical formulas that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Furthermore, to the extent that the terms "including", "includes", "having", "has", "with", or variants thereof are used in either the detailed description and the claims, such terms are intended to be inclusive in a manner similar to the term "comprising." The term "at least one of" is used to mean that one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. $-1$, $-2$, $-3$, $-10$, $-20$, $-30$, etc.

The present disclosure is generally directed to processes for the preparation of hydroxy gallium phthalocyanine (HOGaPc) compounds and to imaging articles and imaging processes thereof. More specifically, processes for transforming hydroxy gallium phthalocyanine Type I polymorph into hydroxy gallium phthalocyanine Type V polymorph are described. The use of hydroxy gallium phthalocyanine Type V polymorph in imaging articles, and to imaging processes and apparatus using the imaging articles is provided.

Figure 1:
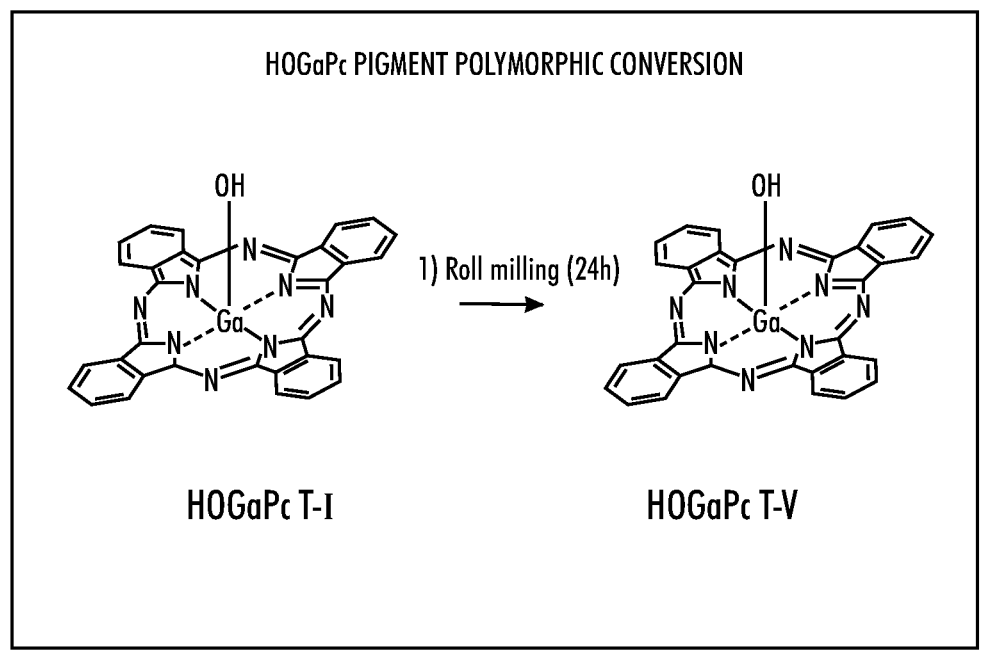
FIG. 1 shows production steps for hydroxy gallium phthalocyanine (HOGaPC) pigment.

Hydroxy gallium phthalocyanine (HOGaPc) photoreceptor pigment is utilized in many photoreceptor (P/R) devices. FIG. 1 shows the step used to convert HOGaPc Type I into HOGaPc Type V polymorph. The Type I polymorph of HOGaPc is typically converted into the Type V polymorph of HOGaPc through roll milling. The roll milling process takes from about one to about four days for complete conversion of Type I polymorph to the Type V polymorph. The total production time for HOGaPc is about three weeks. Thus, the polymorphic conversion from Type I polymorph to Type V polymorph is a relatively long process.

The electrical properties of the resulting HOGaPc Type V polymorph include: an $E_{1/2}$ of from about 1.00 to about 1.40, or from about 1.05 to about 1.35, or from about 1.10 to about 1.30 ergs/cm$^2$; an $E_{7/8}$ of from about 2.60 to about 3.1, or from about 2.65 to about 3.05, or from about 2.70 to about 3.0 ergs/cm$^2$, a residual voltage ($V_r$) of from about 5.0 to about 11.0, or from about 5.5 to about 10.5, or from about 6.0 to about 10. Volts; and a dark decay of less than about 40 Volts at 500 milliseconds squared, or less than about 39 Volts at 500 milliseconds squared, or less than about 38 Volts at 500 milliseconds squared.

Figure 2:
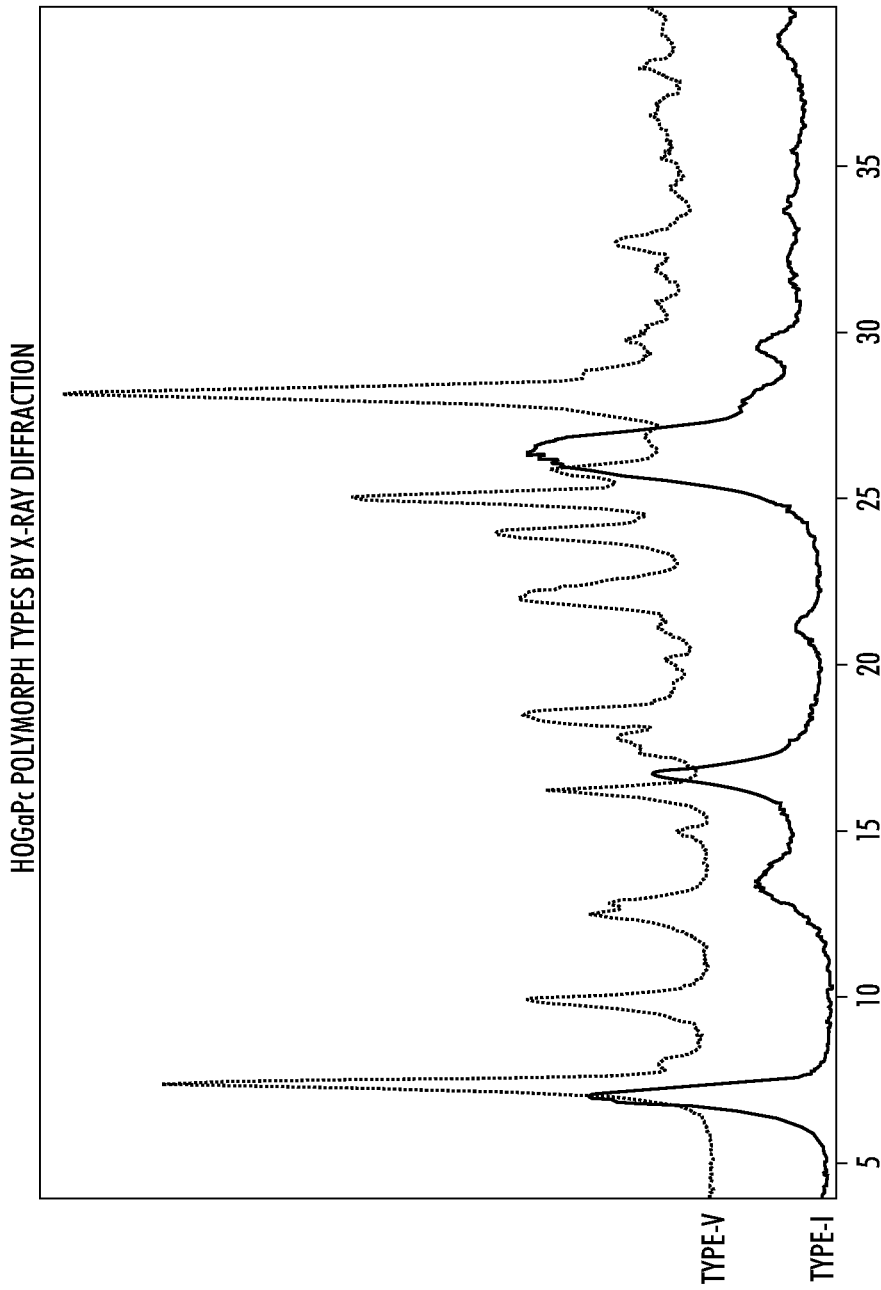
FIG. 2 show X-ray diffraction spectra of HOGaPc polymorphs.

The HOGaPc Type V polymorph product has major peaks at 7.4, 9.8, 12.4, 16.2, 17.6, 18.4, 21.9, 23.9, 25.0 and 28.1 and with the highest peaks at 7.4 and 28.1 degrees 2 Theta (2 Theta plus or minus 0.2 degrees). This is shown in FIG. 2. The Type I polymorph of HOGaPc is shown for comparison purposes. The HOGaPc Type V polymorph product has a λmax of from about 830 to about 860, or from about 835 to about 860 or from about 840 to about 860.

Resonant acoustic mixing is distinct from conventional milling found in a roll mill mixer. Low frequency, high-intensity acoustic energy is used to create a uniform shear field throughout the entire mixing vessel. The result is rapid fluidization (like a fluidized bed) and dispersion of material.

Unlike roll mill mixing, which mixes by inducing bulk flow, the acoustic mixing occurs on a microscale throughout the mixing volume.

In acoustic mixing, acoustic energy is delivered to the components to be mixed. An oscillating mechanical driver creates motion in a mechanical system comprised of engineered plates, eccentric weights and springs. This energy is then acoustically transferred to the material to be mixed. The underlying technology principle is that the system operates at resonance. In this mode, there is a nearly complete exchange of energy between the mass elements and the elements in the mechanical system.

In a resonant acoustic mixing, the only element that absorbs energy (apart from some negligible friction losses) is the mix load itself. Thus, the resonant acoustic mixing provides a highly efficient way of transferring mechanical energy directly into the mixing materials. In the mixing of developer, the resonant frequency is the container and its contents, i.e. the toner particles and the carrier particles. The resonant frequency can be from about 15 Hertz to about 2000 Hertz, or in embodiments from about 20 Hertz to about 1800 Hertz, or from about 20 Hertz to about 1700 Hertz. The resonant acoustic mixing is performed at an acceleration g force of from about 5 G to about 100 G force.

Acoustic mixers rely on a low frequency and low shear resonating energy technology to maximize energy efficiency for mixing. The resonant acoustic mixers vigorously shake the dispersion with up to 100 G of force. The dispersion is mixed at a resonant frequency to maximize energy usage. The process utilizes high intensity, low shear vibrations which induces the natural separation of loosely aggregated particles while simultaneously mixing all regions of the dispersion. This technology is useful for high viscosity systems. Resonant acoustic mixers are available from Resodyn™ Acoustic Mixers.

Disclosed herein is a preparative processes for converting HOGaPc Type I polymorph into a HOGaPc Type V polymorph that avoids using a roll mill or a planetary mill. More specifically, there is provided a process for the preparation of HOGaPc Type V polymorph by, for example, obtaining a slurry of milling media and HOGaPc Type I polymorph at a an organic solvent. The mixing is accomplished through an acoustic mixer at the resonant frequency of the slurry. The time required for the conversion is from about 5 minutes to about 40 minutes, or from about 7 minutes to about 25 minutes or from about 10 minutes to about 20 minutes. The resulting HOGaPc Type V polymorph product quality and electrophotographic performance properties are superior to conventional preparative processes.

Product quality and product properties were achieved with mixing conditions that included an inert milling media. Milling media can be composed of glass, steel, ceramic or any other hard substance that does not react with the HOGaOPc. The milling media must not form contaminates in the slurry. The size of the milling media is from about 0.5 mm to about 10 mm, or from about 0.75 mm to about 8 mm or from about 1 mm to about 7 mm. If the milling media is too small it is difficult to separate it from the pigment. If the milling media is too large it may not be effective. The pigment concentration disclosed herein was from about 1.5 weight percent to about 3.5 weight percent, the solvent was from about 20 weight percent to about 27 weight percent and milling media was from about 70 weight percent to about 80 weight percent. Pigment, solvent and milling media combined to total 100 weight percent.

The organic solvent can be, for example, N,N-dimethylformamide (DMF), pyridine, dimethylsulfoxide, quinoline, 1-chloronaphthalene, N-methylpyrrolidone, and mixtures thereof.

The slurry of HOGaPc and solvent can be comprised of from about 2 weight percent to about 10 weight percent HOGaPc Type I polymorph based on the combined weight of the Type I polymorph and the solvent, or from about 4 weight percent to about 8 weight percent HOGaPc, or from about 5.5 weight percent to about 6.5 weight percent based on the combined weight of the HOGaPc Type I polymorph and the solvent.

The mixing of the slurry in accordance with the present invention can be accomplished, for example, in from about 5 minutes to about 40 minutes, or from about 7 minutes to about 25 minutes, or from about 10 to about 20 minutes. The temperature of the mixing can be accomplished at about 0° C. to about 100° C., or from about 18° C. to about 25° C., or from about 20° C. to about 23° C.

The preparative processes disclosed herein can further comprise washing the hydroxygallium Type V polymorph product with a wash solvent, such as acetone, an aliphatic alcohol, and mixtures thereof, and wherein aliphatic alcohol, for example, methanol, ethanol, butanol, pentanol, and the like alcohols, contains, for example, from 1 carbon atoms to about 25 carbon atoms.

The polymorphic conversion of HOGaPc Type I pigment to HOGaPc Type V pigment requires only about 5 minutes to about 30 minutes using the Resodyn™ Acoustic Mixer (RAM), more specifically the Resodyn™ Acoustic LabRAM 500 mL bench top unit. The process reduces conversion times by from hours to minutes, with no further downstream processing or materials handling required.

The unexpected result of conversion of the HOGaPc Type I polymorph to the HOGaPc Type V polymorph in only 5 to 40 minutes using the Resodyn™ Acoustic LabRAM has obvious advantages such as significantly reducing the process cycle time, and thus cost of the conversion part of the process.

While embodiments have been illustrated with respect to one or more implementations, alterations and/or modifications can be made to the illustrated examples without departing from the spirit and scope of the appended claims. In addition, while a particular feature herein may have been disclosed with respect to only one of several implementations, such feature may be combined with one or more other features of the other implementations as may be desired and advantageous for any given or particular function.

EXAMPLES

Four experiments were conducted using the Resodyn™ LabRAM at 120 mL scale. The first two experiments (1.1 and 1.2) were completed using 6 mm glass beads as the milling media. Experiments 2.1 and 2.2 used 1 mm glass beads as the milling media. The procedures for each are outlined below.

Experiments 1.1 and 1.2

To a 120 mL amber glass bottle was charged 5.4 grams of HOGaPc pigment Type I polymorph, 41 grams of DMF solvent and 108 grams of 6 mm glass beads. The glass bottle was sealed with electrical tape to prevent any leaks, and placed on the Resodyn™ LabRAM with the following conditions; Intensity: 90% which converts to about 81 G, the resonant frequency was about 58 Hz to about 68 Hz; Duration: 10 minutes (1.1) and 20 minutes (1.2). Following the Resodyn™ LabRAM mixing, the pigment slurry was separated from the beads, the beads were rinsed three times with 30 g of DMF to remove pigment residue, followed by the pigment cake washing three times with 100 g of acetone . Finally, the pigment was dried in a vacuum oven at 80° C. for 24 hrs.

Experiments 2.1 and 2.2

To a 120 mL amber glass bottle was charged 2.4 grams of HOGaPc pigment Type I polymorph (SDC supply), 31 grams of DMF solvent and 123 grams of 1 mm glass beads. The bottle was sealed with electrical tape to prevent any leaks, and placed on the Resodyn™ LabRAM with the following conditions; Intensity: 90% which converts to about 81 G, the resonant frequency was about 58 Hz to about 68 Hz; Duration: 10 minutes (2.1) and 20 minutes (2.2). Following the Resodyn™ LabRAM mixing, the pigment slurry was separated from the beads, the beads were rinsed three times with 30 g of DMF to remove pigment residue, followed by the pigment cake washing three times with 100 g of acetone. Finally, the pigment was dried in a vacuum oven at 80° C. for 24 hrs.

Control C 16 was the control sample. This sample was produced using ball milling with 6 mm media. The ratio of pigment to solvent to media was comparable to the above mentioned experiment but the milling time was 24 hrs.
Electrical Evaluation Results The UV spectra of the film show a λmax of approximately 850 in all 4 experiments indicating that polymorphic conversion from Type I HOGaPc to Type V HOGaPc has occurred. Both 6 mm and 1 mm glass beads produced similar results at 10 minutes and 20 minutes of acoustic mixing. The results are summarized in Table 1.

TABLE 1

Electrical evaluation results for LabRAM samples compared to C16 control HOGaPc sample.

| Sample | Dark Decay (500 ms) (V) | S (Verg/cm$^2$) | $E_{1/2}$ (ergs/cm$^2$) | $E_{7/8}$ (ergs/cm$^2$) | $V_r$ | λmax |
|---|---|---|---|---|---|---|
| C16 | 21 | 433 | 1.10 | 2.73 | 7 | 851 |
| 1.1 | 16 | 412 | 1.13 | 2.59 | 6 | 855 |
| 1.2 | 14 | 363 | 1.20 | 2.85 | 9 | 854 |
| 2.1 | 37 | 375 | 1.16 | 2.79 | 8 | 854 |
| 2.2 | 31 | 378 | 1.21 | 2.99 | 10 | 853 |

Figure 3:
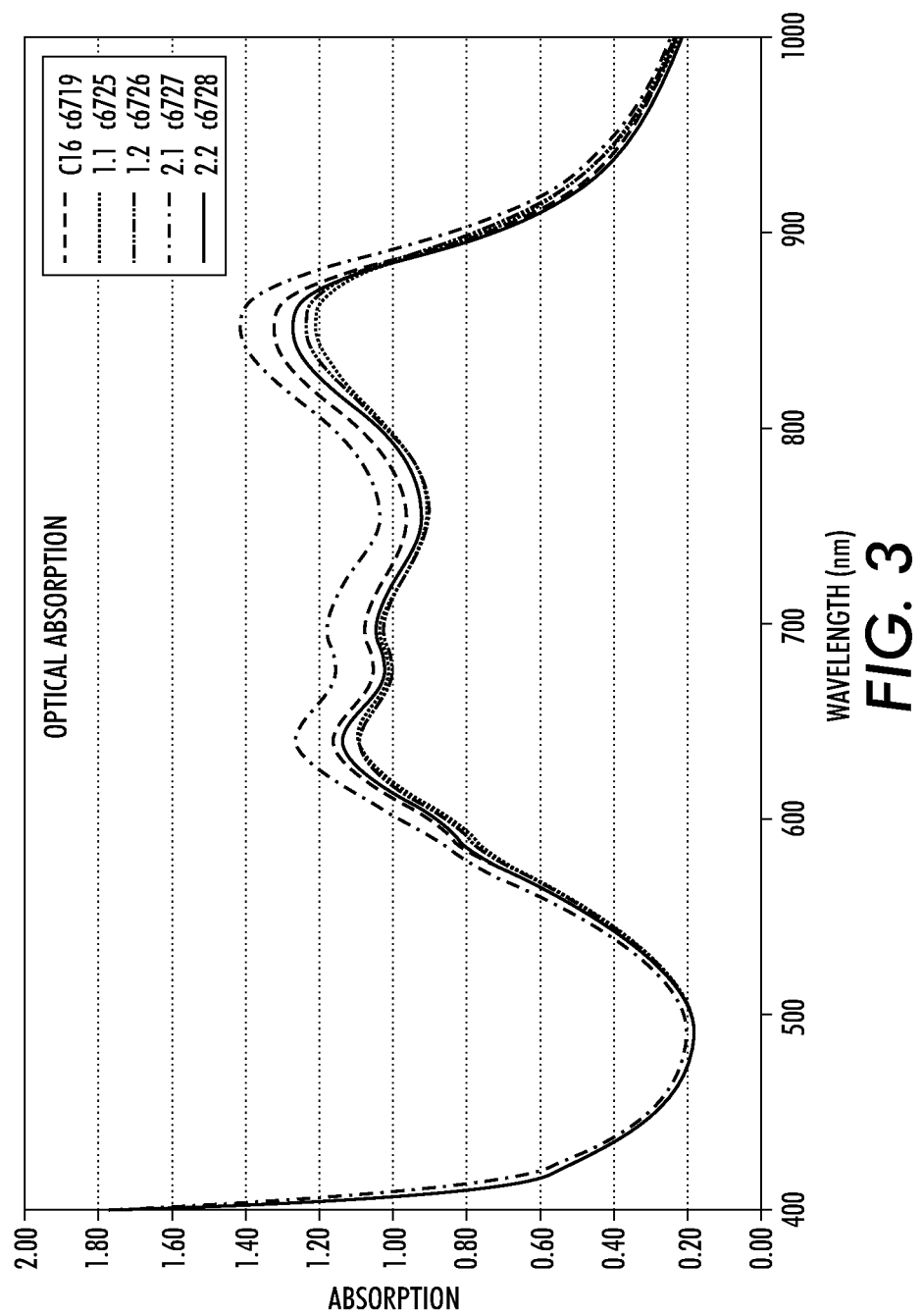
FIG. 3 shows UV spectra of films coated with HOGaPc pigment prepared according to disclosed embodiments and a control HOGaPc sample prepared using a regular roll mill.

FIG. 3 shows the UV spectra of films coated with HOGaPc pigment prepared as described above and HOGaPc pigment prepared as a control (C16). UV spectra of four RAM samples match the UV profile of the C16 control sample prepared using a conventional procedure, indicating that the polymorphic conversion was complete.

Figure 4:
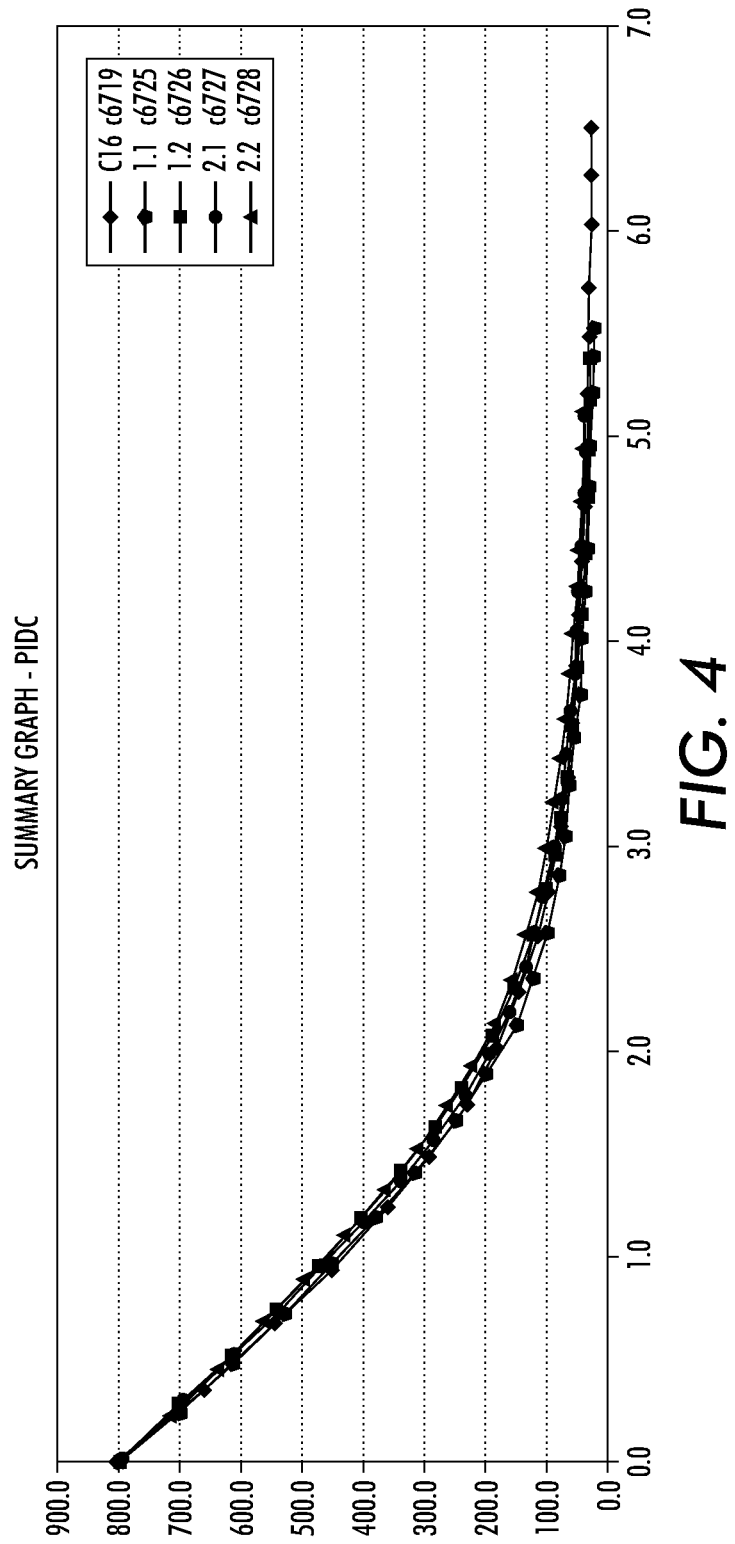
FIG. 4 shows a PIDC (photo induced discharge curve) for the HOGaPc pigment prepared according to disclosed embodiments and a control HOGaPc sample prepared using a regular roll mill.

FIG. 4 shows a PIDC (photo induced discharge curve) for the four LabRAM samples plus a C16 control. PIDC of four RAM samples match PIDC of the C16 control sample prepared using a conventional procedure, indicating that the polymorphic conversion was complete.

Samples for each experiment were evaluated by XRD and BET measurement. XRD confirmed that polymorphic conversion to HOGaPc Type V had occurred. X-Ray diffraction (XRD) spectra showed major peaks at 7.4, 9.8, 12.4, 16.2, 17.6, 18.4, 21.9, 23.9, 25.0, 28.1 and with the highest peaks at 7.4 and 28.1 degrees 2 Theta for all samples (1.1, 1.2, 2.1, 2.2 and C16)

TEM imaging of each sample shows a good comparison in size and morphology between the acoustically mixed samples and the traditional roll milled sample control.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled the in the art which are also encompassed by the following claims.

What is claimed is:

1. A process comprising:
   obtaining a slurry comprising hydroxy gallium phthalocyanine (HOGaPc) Type I polymorph, a solvent and milling media; and
   mixing the slurry at a resonant frequency of the slurry by applying a low frequency acoustic field for a time of from about 5 minutes to about 40 minutes to convert the HOGaPc Type I polymorph to a HOGaPc Type V polymorph.

2. The process in accordance with claim 1, wherein the mixing is at a frequency of between about 15 Hertz and 2000 Hertz.

3. The process in accordance with claim 1, wherein the mixing is performed at a temperature of about 0° C. to about 100° C.

4. The process in accordance with claim 1, wherein electrical properties of the HOGaPc Type V polymorph comprise an $E_{1/2}$ of from about 1.0 to about 1.4 ergs/cm$^2$; an $E_{7/8}$ of from about 2.6 to about 3.1 ergs/cm$^2$; a residual voltage of from about 5 to about 11 Volts; and a dark decay of less than about 40 Volts at 500 milliseconds squared.

5. The process in accordance with claim 1, wherein the slurry is comprised of from about 2 weight percent to about 10 weight percent HOGaPc Type I polymorph based on a combined weight of the Type I polymorph and the solvent.

6. The process in accordance with claim 1, wherein the HOGaPc Type V polymorph comprises a λmax of from about 830 nanometers to about 860 nanometers.

7. The process in accordance with claim 1, wherein the slurry is comprised of from about 5.5 to about 6.5 weight percent based on a combined weight of the HOGaPc Type I polymorph and the solvent.

8. The process in accordance with claim 1, wherein the solvent is N,N-dimethylformamide (DMF).

9. The process in accordance with claim 1, wherein the solvent is selected from the group consisting of N,N-dimethylformamide, pyridine, dimethylsulfoxide, quinoline, 1-chloronaphthalene, N-methylpyrrolidone, and mixtures thereof.

10. The process in accordance with claim 1, wherein the milling media comprise a size of from about 0.5 mm to 10 mm.

11. The process in accordance with claim 1, wherein the milling media comprise a material selected from the group consisting of glass, steel and ceramic.

12. The process in accordance with claim 1, wherein the HOGaPc Type V polymorph product has major peaks at 7.4, 9.8, 12.4, 16.2, 17.6, 18.4, 21.9, 23.9, 25.0, 28.1 and with the highest peaks at 7.4 and 28.1 degrees 2 Theta.

13. The process in accordance with claim 1, further comprising washing the hydroxygallium Type V polymorph with a wash solvent.

14. The process in accordance with claim 1, wherein the wash solvent is selected from the group consisting of acetone and aliphatic alcohols.

15. A process comprising:
mixing a slurry comprising hydroxy gallium phthalocyanine (HOGaPc) Type I polymorph in an organic solvent with glass beads at a resonant frequency of the slurry for a time of from about 5 minutes to about 40 minutes to convert the HOGaPc Type I polymorph to the HOGaPc Type V polymorph wherein the HOGaPC Type V polymorph has major peaks at 7.4, 9.8, 12.4, 16.2, 17.6, 18.4, 21.9, 23.9, 25.0 and 28.1 and with the highest peaks at 7.4 and 28.1 degrees 2 Theta.

16. The process in accordance with claim 15, wherein the organic solvent is selected from the group consisting of N,N-dimethylformamide, pyridine, dimethylsulfoxide, quinoline, 1-chloronaphthalene, N-methylpyrrolidone, and mixtures thereof.

17. The process in accordance with claim 15, wherein the HOGaPc Type V polymorph comprises a $\lambda$max of from about 830 nanometers to about 860 nanometers.

18. A process comprising:
mixing a slurry comprising from about 2 weight percent to about 10 weight percent hydroxy gallium phthalocyanine (HOGaPc) Type I polymorph in N,N-dimethylformamide with glass beads having a size of from 0.5 mm to about 10 mm at a resonant frequency for about 10 minutes to about 20 minutes to convert the HOGaPc Type I polymorph to a HOGaPc Type V polymorph.

* * * * *